United States Patent
Yin et al.

(10) Patent No.: US 10,140,934 B2
(45) Date of Patent: Nov. 27, 2018

(54) PIXEL UNIT, DISPLAY DEVICE AND DRIVING METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiaobin Yin, Beijing (CN); Ku Hyun Park, Beijing (CN); Dongling Sun, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 174 days.

(21) Appl. No.: 14/429,991

(22) PCT Filed: Jun. 30, 2014

(86) PCT No.: PCT/CN2014/081137
§ 371 (c)(1),
(2) Date: Mar. 20, 2015

(87) PCT Pub. No.: WO2015/096439
PCT Pub. Date: Jul. 2, 2015

(65) Prior Publication Data
US 2016/0042704 A1    Feb. 11, 2016

(30) Foreign Application Priority Data

Dec. 27, 2013 (CN) .......................... 2013 1 0737825

(51) Int. Cl.
*G09G 3/36* (2006.01)
*G02F 1/1343* (2006.01)
(Continued)

(52) U.S. Cl.
CPC ..... *G09G 3/3607* (2013.01); *G02F 1/134309* (2013.01); *G06T 5/20* (2013.01);
(Continued)

(58) Field of Classification Search
CPC ................. G06T 5/20; G02F 1/134309; G02F 1/133512; G02F 1/133514; G02F 1/1362;
(Continued)

(56) References Cited

U.S. PATENT DOCUMENTS 6,023,307 A * 2/2000 Park .................. G02F 1/133514
349/106
8,357,959 B2 * 1/2013 Yang ................. H01L 27/14627
257/292

(Continued)

FOREIGN PATENT DOCUMENTS

CN    1152085 A    5/1997
CN    1484071 A    3/2004
(Continued)

OTHER PUBLICATIONS

Second Chinese Office Action dated Mar. 25, 2016; Appln. No. 201310737825.7.
(Continued)

*Primary Examiner* — Amare Mengistu
*Assistant Examiner* — Gloryvid Figueroa-Gibson
(74) *Attorney, Agent, or Firm* — Ladas & Parry LLP

(57) ABSTRACT

A pixel unit, a display device and a driving method thereof are provided. The display unit includes at least four sub-pixels, wherein three sub-pixels are polygonal, while the other at least one sub-pixel is disposed in a gap enclosed by the three polygonal sub-pixels. Thus, the display device according to an embodiment of the present invention can improve light utilization, while reducing structural complexity and driving difficulty

17 Claims, 2 Drawing Sheets

(51) Int. Cl.
   *G06T 5/20* (2006.01)
   *G09G 3/34* (2006.01)
   *G02F 1/1335* (2006.01)
   *G02F 1/1362* (2006.01)

(52) U.S. Cl.
   CPC ......... *G09G 3/3406* (2013.01); *G09G 3/3696* (2013.01); *G02F 1/1362* (2013.01); *G02F 1/133512* (2013.01); *G02F 1/133514* (2013.01); *G02F 2201/122* (2013.01); *G02F 2201/123* (2013.01); *G02F 2201/40* (2013.01); *G02F 2201/52* (2013.01); *G09G 2300/0426* (2013.01); *G09G 2300/0452* (2013.01); *G09G 2320/0626* (2013.01)

(58) Field of Classification Search
   CPC ......... G02F 2201/122; G02F 2201/123; G02F 2201/40; G02F 2201/52; G09G 3/3607; G09G 3/3696; G09G 3/3406; G09G 2320/0626; G09G 2300/0426; G09G 2300/0452
   USPC .................................................. 345/694–696
   See application file for complete search history.

(56) References Cited

U.S. PATENT DOCUMENTS

| | | | | |
|---|---|---|---|---|
| 2004/0046725 A1* | 3/2004 | Lee | ...................... | G09G 3/3607 345/88 |
| 2004/0104435 A1* | 6/2004 | Ohtani | .............. | H01L 21/28518 257/351 |
| 2005/0099378 A1* | 5/2005 | Kim | .................. | G02F 1/134309 345/99 |
| 2005/0140916 A1* | 6/2005 | Kume | ................... | G02F 1/1393 349/156 |
| 2005/0225574 A1 | 10/2005 | Brown et al. | | |
| 2006/0221027 A1* | 10/2006 | Ishihara | ............ | G02F 1/133512 345/88 |
| 2008/0012084 A1* | 1/2008 | Kwon | ............... | H01L 27/14618 257/432 |
| 2008/0067329 A1* | 3/2008 | Yeh | ....................... | G06F 3/0412 250/221 |
| 2009/0109172 A1* | 4/2009 | Lee | ........................ | G09G 3/344 345/107 |
| 2010/0283803 A1 | 11/2010 | Chou | | |
| 2011/0149225 A1* | 6/2011 | Hung | ................... | G09G 3/3648 349/144 |
| 2013/0153748 A1* | 6/2013 | Suzuki | ............. | H01L 27/14607 250/208.1 |

FOREIGN PATENT DOCUMENTS

| | | | |
|---|---|---|---|
| CN | 1831608 A | | 9/2006 |
| CN | 101349845 A | | 1/2009 |
| CN | 201251657 Y | | 6/2009 |
| CN | 202049252 U | | 11/2011 |
| CN | 202512325 U | | 10/2012 |
| CN | 202887618 U | * | 4/2013 |
| CN | 103167252 A | | 6/2013 |
| CN | 103713415 A | | 4/2014 |

OTHER PUBLICATIONS

International Search Report Appln. No. PCT/CN2014/081137; dated Sep. 28, 2014.
Written Opinion of the International Searching Authority Appln. No. PCT/CN2014/081137; dated Sep. 28, 2014.
First Chinese Office Action Appln. No. 201310737825.7; dated Oct. 10, 2015.

* cited by examiner

PIXEL UNIT, DISPLAY DEVICE AND DRIVING METHOD THEREOF

TECHNICAL FIELD

Embodiments of the invention relate to a pixel unit, a display device and a driving method thereof.

BACKGROUND

In recent years, with development of technology, a liquid crystal display technology is constantly improved. A Thin Film Transistor-Liquid Crystal Display (TFT-LCD) dominates a display field due to advantages such as good image quality, low power consumption, and being eco-friendly.

A basic structure of the TFT-LCD comprises an array substrate and a color filter substrate cell-assembled and liquid crystal interposed between the two substrates, in coordination with an external circuit and a backlight, whether the liquid crystal is deflected or not and a deflection degree thereof are regulated by adjusting a voltage difference between the array substrate and the color filter substrate, so as to achieve color display.

It is known to the inventor that the color filter substrate includes square and closely-arranged red color filters, green color filters and blue color filters; and because the color filters of the three colors are all formed by coating a corresponding region with a color resist material, a utilization rate of light emitted from the backlight of the TFT-LCD is relatively low.

SUMMARY OF THE INVENTION

Embodiments of the present invention provide a pixel unit, a display device and a driving method thereof, which can improve the utilization rate of light.

In one aspect, an embodiment of the present invention provides a pixel unit, comprising at least four sub-pixels, wherein three sub-pixels are polygonal, while the other at least one sub-pixel is disposed in a gap enclosed by the three polygonal sub-pixels.

In another aspect, an embodiment of the present invention provides a display device, comprising: a plurality of pixel units as mentioned above, arranged closely; and a black matrix, dividing the plurality of pixel units and a plurality of sub-pixels of each of the pixel units, wherein, the black matrix is disposed around each of the sub-pixels.

In still another aspect, an embodiment of the present invention further provides a driving method of a display device, the display device including a plurality of pixel units arranged closely, each of the pixel units including at least four sub-pixels, wherein three sub-pixels are polygonal, while the other at least one sub-pixel is disposed in a gap enclosed by the three polygonal sub-pixels, the driving method comprising: jointly driving the sub-pixel located in the gap by pixel electrodes of the three polygonal sub-pixels.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

The first embodiment of the present invention provides a pixel unit, comprising at least four sub-pixels, wherein three sub-pixels are polygonal shaped, while the other at least one sub-pixel is disposed in a gap enclosed by the three polygonal sub-pixels.

In the technical solution according to an embodiment of the present invention, because the pixel unit comprises at least four sub-pixels, as compared with pixel units known to the inventor, the pixel unit may include more colors, so as to reduce light filtered out from the backlight, and improve the utilization rate of light emitted from the backlight; and the three sub-pixels therein are polygonal shaped, while the other at least one sub-pixel is disposed in the gap enclosed by the three polygonal sub-pixels, so that a structure of the pixel unit is more compact, which is conducive to achievement of a high-resolution display device.

Here, it should be noted that the polygonal sub-pixels in an embodiment of the present invention refer to the sub-pixels for enclosing the gap; they are defined as the polygonal sub-pixels, which does not mean that the sub-pixel in the gap cannot be polygonal shaped, but only for convenience of description.

Figure 1:
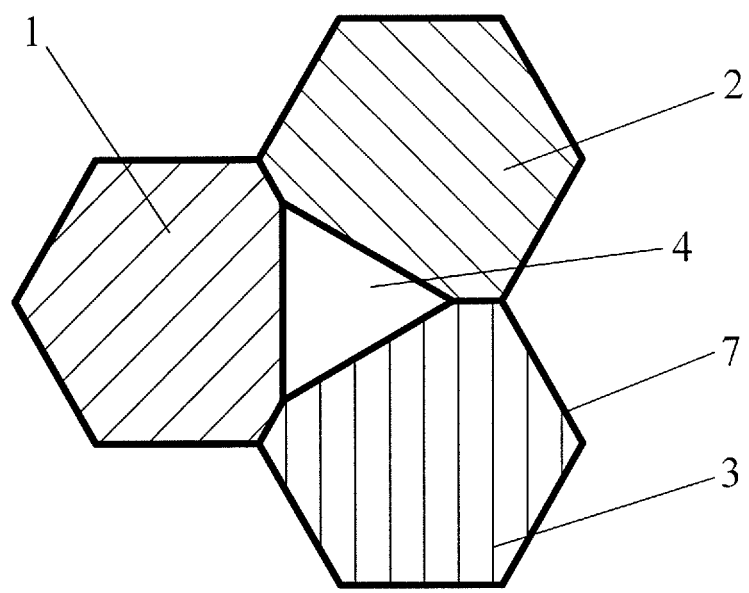
FIG. 1 is a structural schematic diagram of a pixel unit according to an embodiment of the present invention.

Exemplarily, illustration is provided with the pixel unit comprising four sub-pixels as an example, wherein, as shown in FIG. 1, the polygonal sub-pixels enclosing the gap are heptagonal, which, for convenience of description, are respectively designated as a first sub-pixel 1, a second sub-pixel 2 and a third sub-pixel 3; colors of the three polygonal sub-pixels differ from one another, for example, the first sub-pixel 1 is a red sub-pixel, the second sub-pixel 2 is a blue sub-pixel, and the third sub-pixel 3 is a green sub-pixel, wherein the first sub-pixel 1, the second sub-pixel 2 and the third sub-pixel 3 jointly enclose a triangle-shaped gap, which may be defined as a sub-pixel, i.e., a fourth sub-pixel 4.

In order to improve the utilization rate of light emitted from the backlight, the fourth sub-pixel 4 may be a yellow sub-pixel or a white sub-pixel. If the fourth sub-pixel 4 is the yellow sub-pixel, when the light emitted from the backlight passes through the fourth sub-pixel, yellow light can transmit through the fourth sub-pixel 4 and be utilized for display; and if the fourth sub-pixel 4 is the white sub-pixel, light of any wavelength with any color emitted from the backlight can transmit through the fourth sub-pixel 4, so as to improve brightness of the display device.

Figure 2:
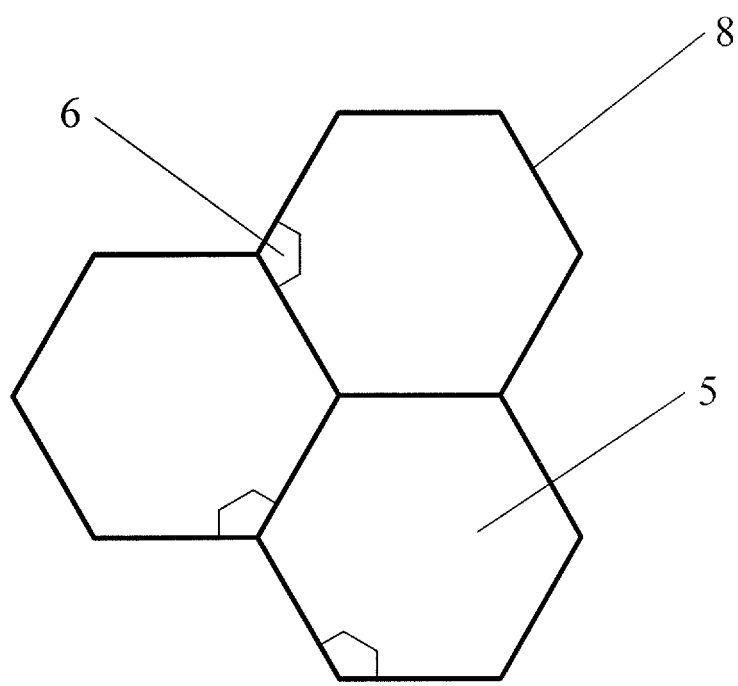
FIG. 2 is a structural schematic diagram of a pixel electrode of the pixel unit according to the embodiment of the present invention.

Alternatively, it can be seen in conjunction with FIG. 1 and FIG. 2 that, the first sub-pixel 1, the second sub-pixel 2 and the third sub-pixel 3 respectively correspond to a pixel electrode 5, and the pixel electrodes 5 of the first sub-pixel 1, the second sub-pixel 2 and the third sub-pixel 3 are arranged closely, i.e., the pixel electrodes 5 of the three polygonal sub-pixels are arranged closely, but the sub-pixel located in the gap is not provided with a pixel electrode. Meanwhile, it can be seen in conjunction with FIG. 1 and FIG. 2 that, the fourth sub-pixel 4 corresponds to the pixel electrodes 5 of the three polygonal sub-pixels, that is, the fourth sub-pixel 4 is jointly driven by the pixel electrodes 5 of the three polygonal sub-pixels, and the pixel electrodes 5 of the three polygonal sub-pixels jointly drive the sub-pixel located in the gap.

Exemplarily, the sub-pixel provided with the pixel electrode is correspondingly provided with a thin film transistor for driving the sub-pixel; whereas, the sub-pixel provided with no pixel electrode does not need to be provided with a thin film transistor. For example, as shown in FIG. 2, only the three sub-pixels enclosing the gap among the four sub-pixels are provided with thin film transistors 6.

Exemplarily, it can be seen in conjunction with FIG. 1 and FIG. 2 that, a change of current outputted from source electrode/drain electrode of the thin film transistor 6 of any polygonal sub-pixel will cause a change of a voltage value of a corresponding pixel electrode, and further cause a change of a voltage difference between the corresponding pixel electrode 5 and a common electrode, and a change of a deflection degree of liquid crystal molecules in a region corresponding to the pixel electrode 5, and further a luminance value of the polygonal sub-pixel corresponding to the pixel electrode, so when a voltage of the pixel electrode of the thin film transistor 6 of any one of the sub-pixels enclosing the fourth sub-pixel 4 changes, the luminance value of the fourth sub-pixel 4 will change as well.

In the technical solution according to an embodiment of the present invention, the pixel electrodes of the three polygonal sub-pixels jointly drive the sub-pixel located in the gap, so a change of the voltage of the pixel electrode of a certain polygonal sub-pixel will result in a change of the deflection degree of the liquid crystal molecules in a region corresponding to the pixel electrode of the polygonal sub-pixel, and further a change of the luminance value of the polygonal sub-pixel, and at the same time, a change of the luminance value of the pixel located in the gap. Then, the luminance value of the sub-pixel located in the gap can change together with the luminance values of the surrounding polygonal sub-pixels without additionally providing a thin film transistor and a chip capable of sensing and analyzing luminance, etc., which reduces complexity of the TFT-LCD structure and difficulty in driving the same, and at the same time, can ensure color saturation and contrast of a display picture of the TFT-LCD, and improve the utilization rate of light emitted from the backlight by the TFT-LCD.

Alternatively, a size of the fourth sub-pixel 4 may be set according to actual situations, so that both brightness and color saturation of the TFT-LCD are the best.

Figure 3:
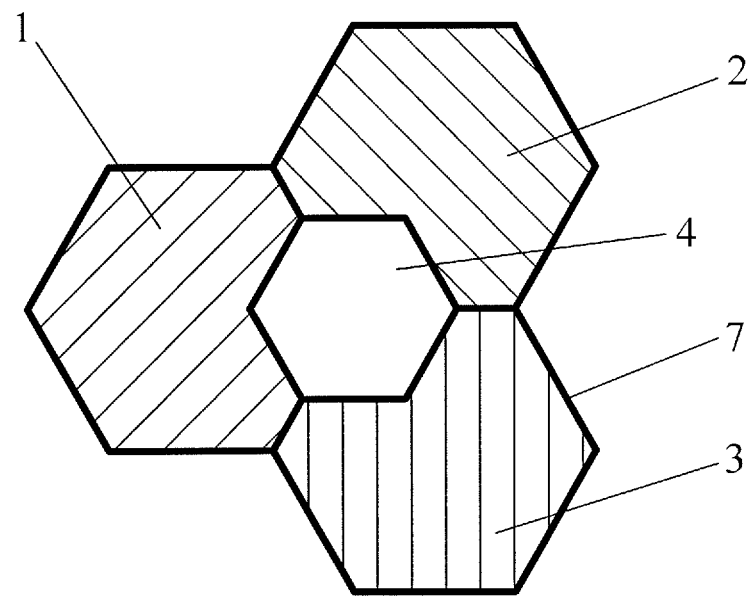
FIG. 3 is another structural schematic diagram of a pixel unit according to an embodiment of the present invention.

It should be noted that, in order to facilitate fabrication, in an embodiment of the present invention, the polygonal sub-pixels enclosing the gap are of a same shape; and in addition to the heptagon as shown in FIG. 1, the polygonal sub-pixels may also be octagonal as shown in FIG. 3, and the shape of the polygonal sub-pixels will not be limited by the present invention.

In consideration of factors such as processing technology, aesthetic level, and display effect, in an embodiment of the present invention, the gap enclosed by the plurality of polygonal sub-pixels is a regular polygon. For example, the fourth sub-pixel 4 is a regular polygon.

Exemplarily, as shown in FIG. 1, the fourth sub-pixel 4 is a regular triangle; and as shown in FIG. 3, the fourth sub-pixel is a regular hexagon, and so on; the more the number of sides of the regular polygon, the larger the fourth sub-pixel 4, which better facilitates the TFT-LCD fully utilizing the light emitted from the backlight, but will result in a more complex structure of the fourth sub-pixel 4; and a pattern of the fourth sub-pixel 4 may be set according to actual situations, which will not be limited by the embodiment of the present invention.

Alternatively, two or more sub-pixels may be provided in the gap enclosed, the two or more sub-pixels correspond to the pixel electrodes of the polygonal sub-pixels enclosing the gap, and may be either yellow sub-pixels or white sub-pixels; the number of the sub-pixel provided in the gap enclosed will not be limited by the embodiment of the present invention, and may be selected by those skilled in the art according to actual situations.

Further, an embodiment of the present invention further provides a display device, comprising: a plurality of pixel units arranged closely as described above; and a black matrix, dividing the plurality of pixel units and a plurality of sub-pixels of each of the pixel units, wherein, the black matrix is disposed around each of the sub-pixels.

Exemplarily, FIG. 2 shows an exemplary pixel unit, wherein the pixel unit includes four sub-pixels: a first sub-pixel 1, a second sub-pixel 2 and a third sub-pixel 3 enclosing a gap, a fourth sub-pixel 4 being located in the gap, and a black matrix 7 being disposed around each sub-pixel.

The black matrix 7 in the display device plays an important role in the TFT-LCD. It can prevent respective sub-pixels from mixing with each other, to maintain necessary color saturation. The black matrix 7 is also used for blocking and absorbing external incident light, to avoid the light directly irradiating or indirectly irradiating by reflection and scattering an active layer of a TFT channel region, causing deterioration of a TFT off-state characteristic; secondly, the black matrix 7 also plays a role in shielding light leakage generated due to a gap between a lead 8 and a pixel electrode 5 on the array substrate, to avoid reduction in image contrast; and thirdly, when a liquid crystal panel is subjected to action of a transverse electric field, liquid crystal molecules at an edge of the pixel will produce a defect of reversing tilting orientation, but the black matrix 7 can prevent reduction in image contrast caused by such a situation.

Thus, in an embodiment of the present invention, in order to further shield leaking light, the black matrix 7 is further disposed corresponding to the gap between the pixel electrodes 5.

Figure 4:
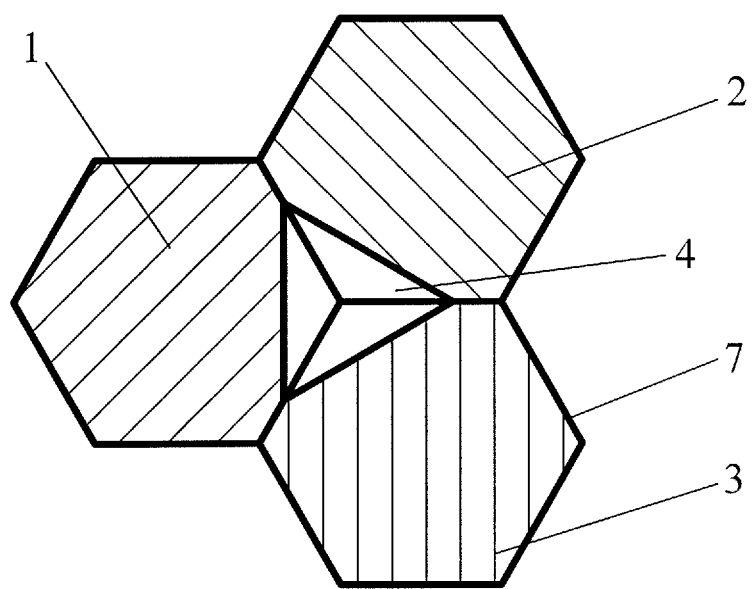
FIG. 4 is yet another structural schematic diagram of a pixel unit according to an embodiment of the present invention.

Exemplarily, it will be illustrated in conjunction with FIG. 1, FIG. 2 and FIG. 3 hereinafter: since there is the fourth sub-pixel 4 surrounded by the polygonal sub-pixels, the fourth sub-pixel 4 makes the lead between the pixel electrodes 5 of the three polygonal sub-pixels to be exposed; in order to prevent degrading of a TFT-LCD display effect due to the light leakage between the lead 8 exposed by the fourth sub-pixel 4 and the surrounding pixel electrodes 5, it is necessary to provide the black matrix 7 for this part of lead. Exemplarily, as shown in FIG. 2, the lead 8 is disposed between the pixel electrodes 5, and therefore, the black matrix 7 is further disposed corresponding to the gap between the pixel electrodes 5 of the polygonal sub-pixels, as shown in FIG. 4.

Because in recent years, people demand higher and higher on transmittance, resolution and power consumption and so on of the display device, the display device develops to have high transmittance, high resolution, and low power consumption, etc. Increased resolution renders smaller side length and size of the sub-pixel, so a side width of the black matrix 7 also needs to be reduced; however, a reduction of the width of the black matrix may lead to a deviation of cell-assembling the array substrate and the color filter substrate, resulting in undesirable phenomena such as light leakage, so the width of the black matrix 7 located on the color filter substrate cannot be arbitrarily reduced. In order to avoid the undesirable phenomena such as light leakage due to reduction of the black matrix 7, the black matrix 7 and the color filter are disposed onto the array substrate , the color filter being disposed corresponding to each sub-pixel. Now the black matrix 7 is located on the array substrate 7, so when the width of the black matrix 7 is appropriately reduced, it is still ensured that the black matrix 7 can sufficiently shield structures that need to be shielded such as the lead on the array substrate, and meanwhile, possibility of the light leakage phenomenon is reduced, and the TFT-LCD display effect is ensured while resolution and transmission are improved. This technology is also known as a Color Filter on Array (COA) technology.

Exemplarily, in the display device according to the embodiment of the present invention, the array substrate is further provided with a plurality of data lines and a plurality of gate lines crossed and insulated from each other, the plurality of data lines and the plurality of gate lines are disposed corresponding to gaps between the pixel electrodes of the polygonal sub-pixels. For example, the plurality of data lines and the plurality of gate lines are polylines, which are disposed along boundaries of the polygonal sub-pixels.

Exemplarily, the lead 8 in FIG. 2 may be a data line or a gate line.

Thus, in the embodiment of the present invention, the COA technology may also be used, i.e., the liquid crystal panel includes the array substrate and a counter substrate, wherein, the black matrix 7 and the color filter disposed corresponding to each sub-pixel are located on the array substrate or the counter substrate. Clearly, when both the color filter and the black matrix 7 are located on the counter substrate, the counter substrate is the color filter substrate in the prior art.

For example, for the examples shown in the accompanying drawings, the color filters corresponding to the three polygonal sub-pixels are respectively a red color filter, a blue color filter, and a green color filter.

Further, the display device may be a liquid crystal panel, a liquid crystal television, a liquid crystal display, a digital photo frame, a mobile phone, a tablet personal computer, and any other product or component having a display function.

Further, an embodiment of the present invention also provides a drive method of the above display device, as described above, the display device including a plurality of pixel units arranged closely, the pixel unit including at least four sub-pixels, wherein three sub-pixels are polygonal sub-pixels, while the other at least one sub-pixel is disposed in a gap enclosed by the three polygonal sub-pixels, and the drive method comprising: pixel electrodes of the three polygonal sub-pixels jointly driving the sub-pixel located in the gap.

Accordingly, the pixel electrodes of the three polygonal sub-pixels jointly drive the sub-pixel located in the gap, so change of the voltage of the pixel electrode of a certain polygonal sub-pixel will result in change of a deflection degree of liquid crystal molecules in a region corresponding to the pixel electrode of the polygonal sub-pixel, which in turn changes the luminance value of the polygonal sub-pixel, and at the same time, changes the luminance value of the pixel located in the gap. Then, it is not necessary to additionally provide a thin film transistor and a chip capable of sensing and analyzing luminance, etc., so that the luminance value of the sub-pixel located in the gap can be changed together with the luminance value of the surrounding polygonal sub-pixels, which reduces complexity of the TFT-LCD structure and driving difficulty, and at the same time, can ensure color saturation and contrast of a display picture of a TFT-LCD and improve the utilization rate of light emitted from the backlight by the TFT-LCD.

With regard to a pixel unit and a display device according to embodiments of the present invention, because the pixel unit comprises at least four sub-pixels, as compared with the conventional pixel unit, the pixel unit may include more colors, so as to reduce light filtered out from the backlight, and improve the utilization rate of light emitted from the backlight; and the three sub-pixels therein are polygonal, while the other at least one sub-pixel is disposed in the gap enclosed by the three polygonal sub-pixels, so that a structure of the pixel unit is more compact, which is conducive to achievement of a high-resolution display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201310737825.7 filed on Dec. 27, 2013, the disclosure of which is incorporated herein by reference in its entirety as part of the present application.

What is claimed is:

1. A pixel unit, comprising at least four sub-pixels,
   wherein three sub-pixels are polygonal, while the other at least one sub-pixel is disposed in a gap surrounded by the three polygonal sub-pixels;
   wherein each of the three polygonal sub-pixels comprises a pixel electrode, and the pixel electrodes of the three polygonal sub-pixels jointly drive the sub-pixel located in the gap such that a change of a voltage of any one of the pixel electrodes of any one of the three polygonal sub-pixels will result in a change of the deflection degree of liquid crystal molecules in a region corresponding to the any one of the pixel electrodes, and further a change of a luminance value of the any one of the polygonal sub-pixels, and at the same time, a change of a luminance value of the other at least one sub-pixel disposed in the gap, whereby the luminance value of the other at least one sub-pixel disposed in the gap changes together with luminance values of the surrounding three polygonal sub-pixels.

2. The pixel unit according to claim 1, wherein the pixel unit comprises four sub-pixels, the sub-pixel located in the gap surrounded by the three polygonal sub-pixels is a yellow sub-pixel or a white sub-pixel.

3. The pixel unit according to claim 2, wherein the pixel electrodes of the three polygonal sub-pixels are arranged closely.

4. The pixel unit according to claim 3, wherein the three polygonal sub-pixels are in a same shape.

5. The pixel unit according to claim 4, wherein the shape of the polygonal sub-pixels is octagonal or heptagonal.

6. The pixel unit according to claim 2, wherein each of the three polygonal sub-pixels is provided with a thin film transistor, and the sub-pixel located in the gap is provided with no thin film transistor.

7. The pixel unit according to claim 2, wherein a color filter corresponding to the sub-pixel located in the gap is a white color filter or a yellow color filter.

8. The pixel unit according to claim 2, wherein the sub-pixel located in the gap is provided with no pixel electrode.

9. A display device, comprising:
a plurality of pixel units according to claim 1 arranged closely; and
a black matrix, dividing the plurality of pixel units and a plurality of sub-pixels of each of the pixel units,
wherein, the black matrix is disposed around each of the sub-pixels.

10. The display device according to claim 9, wherein the black matrix is disposed corresponding to a gap between pixel electrodes of the polygonal sub-pixels.

11. The display device according to claim 9, wherein the display device comprises an array substrate and an opposed substrate cell-assembled, and the black matrix is located on the array substrate or the opposed substrate.

12. The display device according to claim 11, wherein the array substrate is provided with a plurality of data lines and a plurality of gate lines crossed each other and insulated from each other, and the plurality of data lines and the plurality of gate lines are disposed corresponding to a gap between pixel electrodes of the polygonal sub-pixels.

13. The display device according to claim 12, wherein the plurality of data lines and the plurality of gate lines are polylines.

14. The display device according to claim 11, wherein, the opposed substrate or the array substrate is further provided with color filters corresponding to each sub-pixel of each of the pixel units.

15. The display device according to claim 14, wherein the color filters corresponding to the three polygonal sub-pixels enclosing the gap are respectively a red color filter, a blue color filter, and a green color filter.

16. The display device according to claim 14, wherein at least one of the color filters corresponding to the sub-pixel located in the gap is a white color filter or a yellow color filter.

17. A driving method of a display device, the display device comprising:
a plurality of pixel units arranged closely, each of the pixel units including at least four sub-pixels, wherein three sub-pixels are polygonal, while the other at least one sub-pixel is disposed in a gap surrounded by the three polygonal sub-pixels; and
a black matrix, dividing the plurality of pixel units and a plurality of sub-pixels of each of the pixel units,
wherein the black matrix is disposed around each of the sub-pixels;
wherein each of the three polygonal sub-pixels comprises a pixel electrode;
the driving method comprising:
jointly driving the sub-pixel located in the gap by the pixel electrodes of the three polygonal sub-pixels, wherein the pixel electrodes of the three polygonal sub-pixels jointly drive the sub-pixel located in the gap such that a change of a voltage of any one of the pixel electrodes of any one of the three polygonal sub-pixels will result in a change of the deflection degree of liquid crystal molecules in a region corresponding to the any one of the pixel electrodes, and further a change of a luminance value of the any one of the polygonal sub-pixels, and at the same time, a change of a luminance value of the other at least one sub-pixel disposed in the gap, whereby the luminance value of the other at least one sub-pixel disposed in the gap changes together with luminance values of the surrounding three polygonal sub-pixels.

* * * * *